(12) United States Patent
Hexin

(10) Patent No.: US 12,529,226 B2
(45) Date of Patent: Jan. 20, 2026

(54) BAMBOO CONSTRUCTION ELEMENT

(71) Applicant: THE COURT OF EDINBURGH NAPIER UNIVERSITY, Lothian (GB)

(72) Inventor: Zhang Hexin, Edinburgh (GB)

(73) Assignee: THE COURT OF EDINBURGH NAPIER UNIVERSITY, Lothian (GB)

( * ) Notice: Subject to any disclaimer, the term of this patent is extended or adjusted under 35 U.S.C. 154(b) by 251 days.

(21) Appl. No.: 18/258,123

(22) PCT Filed: Dec. 17, 2021

(86) PCT No.: PCT/GB2021/053350
§ 371 (c)(1),
(2) Date: Jun. 16, 2023

(87) PCT Pub. No.: WO2022/129936
PCT Pub. Date: Jun. 23, 2022

(65) Prior Publication Data
US 2024/0052632 A1 Feb. 15, 2024

(30) Foreign Application Priority Data
Dec. 18, 2020 (GB) ...................................... 2020124

(51) Int. Cl.
*E04C 2/12* (2006.01)
*B32B 3/18* (2006.01)
(Continued)

(52) U.S. Cl.
CPC ................. *E04C 2/12* (2013.01); *B32B 3/18* (2013.01); *B32B 7/12* (2013.01); *B32B 21/13* (2013.01);
(Continued)

(58) Field of Classification Search
CPC .... E04C 2/12; B32B 3/18; B32B 7/12; B32B 21/13; B32B 37/12; B32B 2250/03;
(Continued)

(56) References Cited

U.S. PATENT DOCUMENTS

| 7,981,233 | B2 | 7/2011 | Wellwood et al. |
| 8,709,578 | B2 | 4/2014 | Zhang et al. |
| 8,747,987 | B2 | 6/2014 | Yu et al. |

FOREIGN PATENT DOCUMENTS

| CN | 2344164 Y | 10/1999 |
| CN | 2876221 Y | 3/2007 |

(Continued)

OTHER PUBLICATIONS

Archila Santos, H, Rhead, A, Ansell, MP, Walker, P & Lizarazo-Marriaga, J 2019, 'Elastic response of cross laminated engineered bamboo panels subjected to in-plane loading', Proceedings of the Institution of Civil Engineers: Construction Materials, vol. 172, No. 6, pp. 284-295. https://doi.org/10.1680/jcoma.16.00080, DOI: 10.1680/jcoma.16.00080, Publication date: 2019.

(Continued)

*Primary Examiner* — Patrick J Maestri
(74) *Attorney, Agent, or Firm* — Foley & Lardner LLP

(57) ABSTRACT

The present invention relates to a construction element comprising a first and second bamboo layer and having a core layer interposed therebetween, wherein at least one of the first and second bamboo layers are fabricated with a residual stress. The present invention further relates to a method of manufacturing said construction element.

23 Claims, 16 Drawing Sheets

(51) Int. Cl.
   *B32B 7/12* (2006.01)
   *B32B 21/13* (2006.01)
   *B32B 37/12* (2006.01)

(52) U.S. Cl.
   CPC .......... *B32B 37/12* (2013.01); *B32B 2250/03* (2013.01); *B32B 2419/00* (2013.01)

(58) Field of Classification Search
   CPC ............ B32B 2419/00; B32B 2307/50; B32B 2307/514; B32B 2307/54; B32B 2307/542; B32B 2307/546; B32B 2607/00; B32B 7/03; B32B 9/02; B32B 2250/05; B32B 2307/732; B32B 7/08; B32B 9/042; B32B 21/042
   See application file for complete search history.

(56) References Cited

FOREIGN PATENT DOCUMENTS

| CN | 101745947 A | 6/2010 |
|---|---|---|
| CN | 202640497 U | 1/2013 |
| CN | 103231423 A | 8/2013 |
| CN | 104015234 A | 9/2014 |
| CN | 104772798 A | 7/2015 |
| CN | 204955040 U | 1/2016 |
| CN | 211736192 U | 10/2020 |
| EP | 2 206 588 A1 | 7/2010 |
| WO | WO-2005/035209 A2 | 4/2005 |

OTHER PUBLICATIONS

Development of bamboo scrimber: a literature review. Huang et al. J Wood Sci (2019) 65:25 https://doi.org/10.1186/s10086-019-1806-4.

Engineered bamboo for structural applications. Bhavna Sharma et al. Department of Architecture, University of Cambridge, Cambridge, UK. Received in revised form Jan. 27, 2015, Accepted Jan. 29, 2015, Available online Feb. 23, 2015, http://dx.doi.org/10.1016/j.conbuildmat.2015.01.077, 0950-0618 copyright 2015.

Engineered bamboo: state of the art. Bhavna Sharma et al. Proceedings of the Institution of Civil Engineers, Construction Materials 168 Apr. 2015 Issue CM2, pp. 57-67 http:/dx.doi.org/10.1680/coma_14.00020, Paper 1400020 Accepted Aug. 14, 2014, Published online Oct. 14, 2014.

Mechanical characterisation of structural laminated bamboo. Bhavna Sharma et al. Proceedings of the Institution of Civil Engineers Structures and Buildings 170 Apr. 2017 Issue SB4 pp. 250% u2013264 http://dx.doi.org/10.1680/jstbu.16.00061, Paper 1600061, Accepted Sep. 14, 2016, Published online Oct. 10, 2016.

The Effects of bamboo species and adhesive type on mechanical properties of laminated bamboo lumber (LBL). Seyedmohammad Mirmehdi (Ph.D Student). Research Proposal, Universidade Federal De Lavras.

International Search Report and Written Opinion cited in the International Patent Application PCT/GB2021/053350.

| Example | Modulus of Rupture (MPa) | Cross-section |
|---|---|---|
| Comparative Example | 26 |  |
| Example 1 | 50 |  |
| Example 2 | 75 |  |

BAMBOO CONSTRUCTION ELEMENT

CROSS-REFERENCE TO RELATED APPLICATIONS

This application claims the benefit of priority to International Application No. PCT/GB2021/053350, filed on Dec. 17, 2021, which claims the benefit of Great Britain Patent Application No. 2020124.0, filed Dec. 18, 2020, each of which are hereby incorporated by reference in their entireties.

The present invention relates to a construction element and a method of manufacturing said construction element.

INTRODUCTION

The recent trend towards the use of more sustainable constructions materials has seen a growing demand for structural timber products for building materials. Glued Laminated Timber (glulam) is one of the most popular materials due to its excellent performance, sustainability and aesthetic characteristics. However, increasing concerns associated with the environmental and ecological impact of deforestation highlight the need for alternatives to traditional wood materials.

In the search for non-timber forest products to substitute for wood, bamboo has emerged as a leading candidate. In particular, it is now widely recognized that bamboo in panel form may be an ideal replacement for wood in several applications owning to its properties of comparable strength to modern structural materials, easy processing and rapid growth in comparison to common trees. The rapid growth and renewability of bamboo are ideal characteristics for use in construction. The widespread use of raw bamboo in construction is restricted by the inherent variability in its geometric and mechanical properties, and a lack of standardisation. Engineered bamboo aims to reduce the variability of the raw material and is processed and manufactured into laminated composites. The most common forms of engineered bamboo are bamboo scrimber and laminated bamboo. Bamboo scrimber, also referred to as strand woven or parallel strand bamboo, consists of crushed fibre bundles saturated in resin and compressed into a dense block. Laminated bamboo is formed when the bamboo culm is split, planed, processed (bleached or caramelised), laminated and pressed to form the board product. This process maintains both the longitudinal fibres as well as a portion of the original culm matrix.

Although bamboo and wood are comparable in strength to steel at equivalent weight, the widespread use of bamboo and small dimensional wood in structural applications has been restricted due to the lower strength of these materials in practical terms.

Prestressed structures are widely used in tall buildings, long span structures and bridges to increase stiffness and rigidity of the material due to the active stresses. However, there has been little focus on prestressed timber structures. Bearing strength and the time-related stress relaxation have prevented the traditional prestressed technologies from being applied to timber structures directly. Additionally, existing techniques typically involve the installation of the steel bars inside the timber beam, which are then tensioned to generate the prestressed forces inside the beam. However, it can be difficult to install and grout the steel bar. Additionally, once installed the timber beam can no longer be cut to size in situ. The timber bearing capacity will also limit the level of the prestressed loads can be applied.

Therefore, there remains a need to produce high strength, multi-purpose construction elements prepared from sustainable, environmental-friendly and economically favourable construction materials, in particular, for long-span and tall building structures.

SUMMARY OF INVENTION

In a first aspect, there is provided a construction element comprising at least a first and second bamboo layer and having a core layer interposed therebetween, characterised in that at least one of the first and second bamboo layers are fabricated with a residual stress.

Advantageously, such construction elements may possess greater resistance to deflection and demonstrate an improved dynamic response, which are typically challenging design considerations for timber structures.

The construction element may be a truss, a wall panel, a floor panel, a column or pillar, or a beam, optionally, a sandwich beam, an I-beam or a double-web beam.

The thickness of the first and second layers may range from 10 mm to 600 mm and can be different from each other. The thickness of the core layer may range from 100 mm to 3000 mm. The lengths of the construction element along two adjacent edges may range from 100 mm to 16,000 mm, and can be different in each direction.

In the context of the present invention, residual stress should be understood to mean an internal stress distribution that is locked into each of the first and second layers. Residual stresses are stresses that remain in a solid material after the original cause of stress has been removed. During the subsequent assembly of the construction element, the first and second layers are pressed onto the core layer to introduce a pre-stressed status to the construction element. The pre-stresses counteract the external loads and reduce the deflection and dynamic response. In particular, the core is strengthened by the pre-stressed first and second layer to provide better structural rigidity, smaller deflection and dynamic response by increasing the strength of the overall structure.

Advantageously, the pre-stresses are continuously distributed in the structural element in order to avoid the stress concentration at the anchor point and mitigate the time-related stress relaxation problem. Additionally, as the pre-stress is introduced without the need for tensioned steel bars, openings can be made or the construction element itself can be cut to size in-situ. In particular, in some embodiments the first and second bamboo layers may comprise or consist of bamboo and, optionally, an adhesive or other similar bonding agent.

Using the pre-stress technology in this way redistributes the stresses between the core layer and the first and second bamboo layer. When the construction element is subjected to the external loadings, the stresses in the pre-stressed first and second layers will continue to increase on top of the pre-stress stresses to further ultilise the strength capacity of the bamboo. The pre-stress stresses in the core layer counteract with the external loading so that final stresses in the core layer are smaller than an otherwise equivalent non-pre-stressed construction element. This in turn allows the use of fast-growing low-grade timber in manufacturing the core layer component to produce a more environmentally friendly, economical, and high-strength composite construction element.

Therefore, the present invention allows the use of fast glowing economical natural materials (bamboo and softwood) to produce high strength construction materials.

Further, the construction element possesses an attractive wooden appearance, excellent sustainability, and is prepared from environmental-friendly and architect-favoured construction materials.

Suitably, each of the first and second bamboo layers may be fabricated with residual stress.

Suitably, the first and/or second bamboo layers may have a first surface that is in compression and a second surface that is in tension.

Suitably, the first and/or second layers may be biased against a pre-formed radius of curvature. In the context of the present invention, a radius of curvature should be understood to mean the radius of a circle that best fits a normal section of the respective first and/or second layers. The radius of curvature may be customised or adjusted to produce a construction element having the desired level of pre-stress.

Suitably, the first and/or second bamboo layers may be formed from a plurality of superposed bamboo sub-layers. In this way, the sub layers are produced individually such that the radius of curvature of each sub-layer may be customised as desired. This also provides advantages in manufacturing as each sub-layer can be curved individually at lower pressures.

Suitably, the sub-layers may be formed of engineered bamboo such as laminated bamboo or bamboo scrimber. This may be advantageous since engineered bamboo is known to reduce the variability encountered in raw bamboo and can be processed and manufactured into laminated composites. The engineered bamboo may be straight or curved engineered bamboo.

Suitably, the plurality of sub-layers may be arranged such that the bamboo fibres in each sub-layer are parallel to bamboo fibres in adjacent sub-layers. This arrangement may be utilised to produce a one-way pre-stressed condition in the final construction element.

Suitably, the plurality of sub-layers may be arranged such that the bamboo fibres in each sub-layer are arranged perpendicular to bamboo fibres in adjacent sub-layers. This arrangement will produce a two-way pre-stressed condition in the final construction element.

Suitably, the core layer may comprise a laminated wood. The composition of the laminated wood core layer can be tailored to produce more economical products while also satisfying engineering and architectural requirements. For example, the core layer may comprise cross-laminated wood such as cross-laminated timber interlayers or cross-laminated engineered bamboo and timber interlayers. The engineered bamboo may be straight engineered bamboo. As timber typically-accommodates non-predrilled metal fixings better than the engineered bamboo and engineered bamboo generally has higher strength, the combination of engineered bamboo and timber core may utilise the advantages of both materials. The mixed engineered bamboo and timber layers may also have a better acoustic performance than the cross-laminated timber (CLT), which has a better level of sound reduction. Other compositions and configurations of the laminated wood core layer will be apparent to a person skilled in the art.

Suitably, the core layer may comprise at least one support member arranged perpendicular to the first and second bamboo layers and extending therebetween. For example, the support member may be a web. The support member (or web) may be formed from engineered bamboo. The presence of the support member between the first and second layers advantageously forms a strong scaffold. In particular, the first and second layers are spaced apart from each other by the support member to create a large lever arm, which increases the bending capacity of the construction element. Thus, the support member enhances the shear capacity of the whole construction element.

Suitably, the at least one support member may be connected to the first and second bamboo layers via a butt connection. The simple butt connection offers easy manufacturing. Additionally or alternatively, the first and second bamboo layer may each comprise at least one groove configured to receive the at least one support member in a tongue-and-groove arrangement. Tongue-and-groove connections increase the strength of the connection between support member(s) and the first and second layers. This may reduce the risk of early failure at the connection and increase the overall strength of the whole construction element.

Suitably, the core layer may comprise a plurality of support members. The spaces in-between the support member may be left unfilled if the external loading is not expected to be high. Alternatively, a wood or insulation material may be arranged between said support members. The presence of insulation foam may improve the thermal performance and/or other properties of the construction element. For example, the insulating member may comprise at least one of a temperature insulating member, a sound insulating member and/or a humidity insulating member.

In a second aspect, there is provided a method of manufacturing the construction element described above, comprising assembling a first and second bamboo layer with a core layer interposed therebetween, characterised in that at least one of the first and second bamboo layers are fabricated with a residual stress.

The first and second layers and the core layer may be bonded together by adhesive or mechanical fixings (e.g. nails, screws, bolts, dowels, etc). Additionally, any suitable connection between the first and second layers and the core layer may be used. For example, the first and second layers may be connected to the core layer via a tongue-and-groove or a butt connection.

Suitably, said assembling may comprise:
  providing the first and second bamboo layer, wherein at least one of the first and/or second bamboo layer(s) has a pre-formed radius of curvature;
  providing the core layer; and
  pressing the first and second bamboo layers and the core layer together such that the first and/or second bamboo layers are substantially straightened against the pre-formed radius of curvature to induce the residual stress.

That is, a pre-stressed condition is introduced to the construction element during the manufacturing process, for example, during the pressing process as the first and second layers are straightened or substantially straightened against an outer surface of the core layer. When the press is released, the pre-stresses are retained in the first layer and interact with the other parts of the construction element. As described above, the pre-stressed first and second bamboo layers increase the strength of the overall structure by counteracting external loads and reducing the deflection and dynamic response to provide better structural rigidity.

Suitably, the method may comprise the initial steps of:
  (i) providing a plurality of bamboo sub-layers;
  (ii) applying an adhesive to the sub-layers;
  (iii) pressing, and optionally heating, the sub-layers until the adhesive is cured to form the first bamboo layer having a pre-formed radius of curvature; and
  (iv) optionally, repeating steps (i) to (iii) to form the second bamboo layer;
to provide the first and/or second bamboo layer(s).

That is, the sub-layers are pressed, and optionally heated, in a curve mode. When the press is released, the first and/or second layers retain a radius of curvature. This process induces the residual stress. Suitably, each of the first and second bamboo layers are fabricated with residual stress Suitably, the sub-layers may be formed of engineered bamboo, such as laminated bamboo or bamboo scrimber. The engineered bamboo may be straight or curved engineered bamboo.

Suitably, the plurality of sub-layers may be arranged such that the bamboo fibres in each sub-layer are parallel to bamboo fibres in adjacent sub-layers to produce a one-way pre-stressed construction element.

Alternatively, the plurality of sub-layers may be arranged such that the bamboo fibres in each sub-layer are arranged perpendicular to bamboo fibres in adjacent sub-layers to produce a two-way pre-stressed construction element.

Optionally, the method may further comprise forming tongue-and-groove channels in a surface of the first and second bamboo layers.

It will be appreciated that any feature described herein as being suitable for incorporation into one or more aspects or embodiments of the present invention is intended to be generalisable across any aspect or embodiment of the present disclosure.

BRIEF DESCRIPTION OF DRAWINGS

The accompanying drawings illustrate presently exemplary embodiments of the disclosure, and together with the general description given above and the detailed description of the embodiments given below, serve to explain, by way of example, the principles of the disclosure.

DETAILED DESCRIPTION

The present invention provides a lightweight, high strength, multi-purpose construction element with flexible configurations to accommodate different engineering and architectural requirements, in particular, for long-span and tall building structures.

Figure 1:
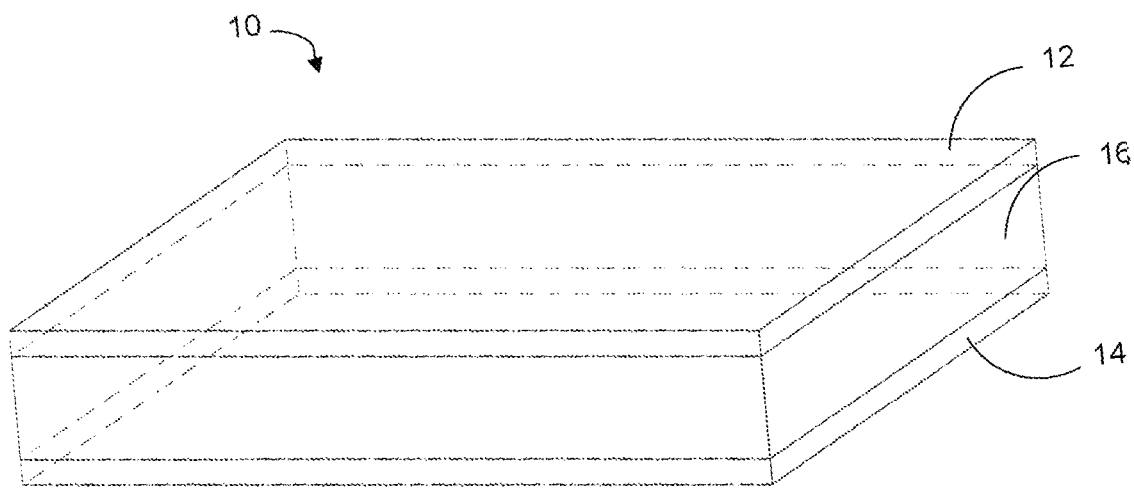
FIG. 1 is a schematic view of a construction element according to an embodiment of the invention.

A construction element 10 according to one embodiment is shown in FIG. 1. The construction element 10 has a first layer 12, and second layer 14 and a core layer 16 interposed therebetween. In other words, the first and second layers 12, 14 are outer layers and the core layer 16 is a middle layer, sandwiched between the outer layers. Each layer is manufactured separately and can be customised for different end uses, as described in more detail below.

The first and second layers 12, 14 are formed of a plurality of superposed engineered bamboo sub-layers. For example, the engineered bamboo may be laminated bamboo or bamboo scrimber. The thickness of each sub-layer may range from 6 mm to 200 mm and can be different from each other. Each of the first and second layers 12, 14 are fabricated with a residual stress. In one embodiment, engineered bamboo strips are pressed and glued together in a curved mode to form each sub-layer of the first and second layers. In this way, the curvature of each sub-layer is adjustable to create a pre-configured radius of curvature. In the illustrated embodiment, the radius of curvature is the same for each sub-layer. However, it should be understood that in other embodiments the sub-layers may each have a different radius of curvature. Similarly, the sub-layers of the first bamboo layer may be formed with a different radius of curvature to the sub-layers of the second bamboo layer.

Figure 2:
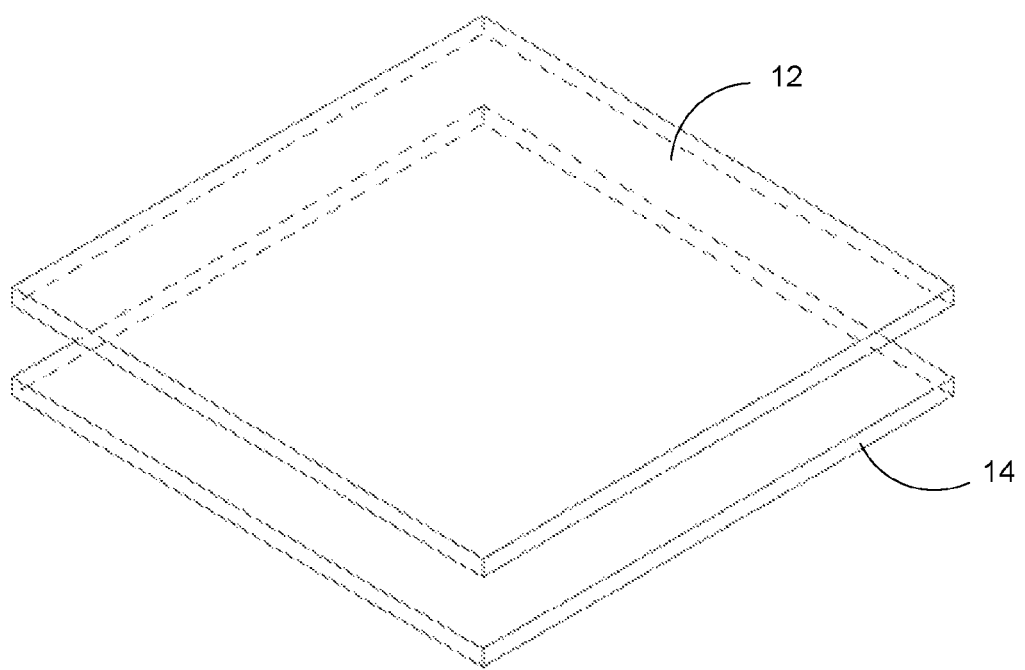
FIG. 2 shows a first and second layer according to an embodiment of the invention.
Figure 3:
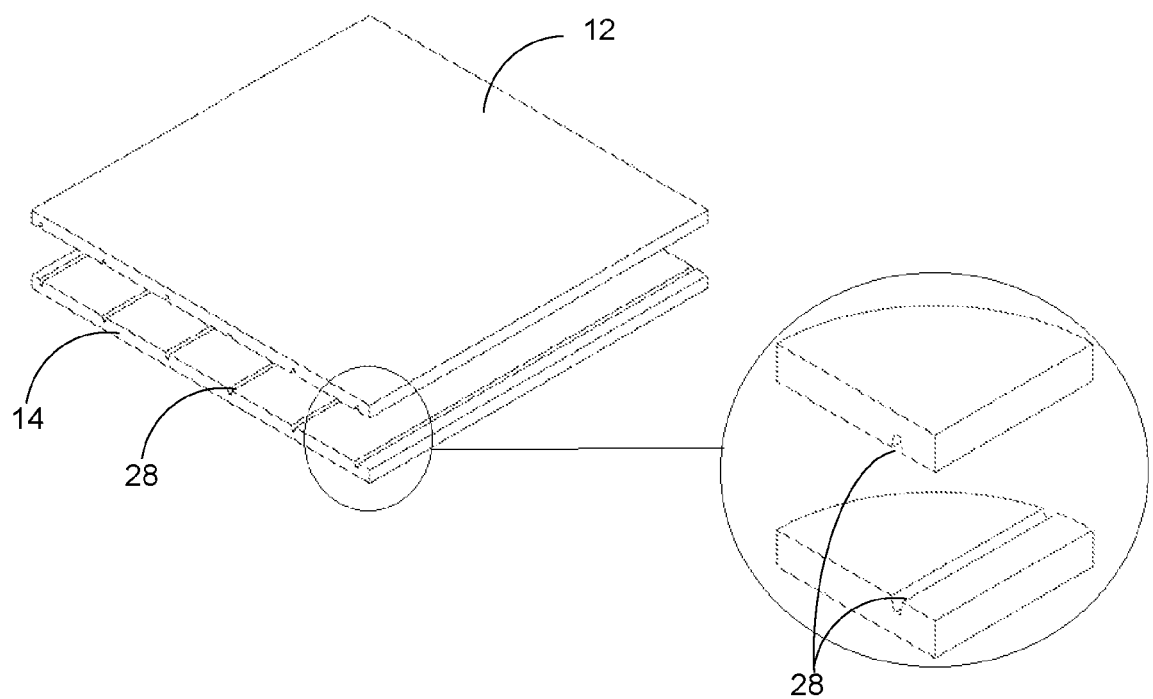
FIG. 3 shows a first and second layer having tongue-and-groove channels according to an embodiment.
Figure 4A:
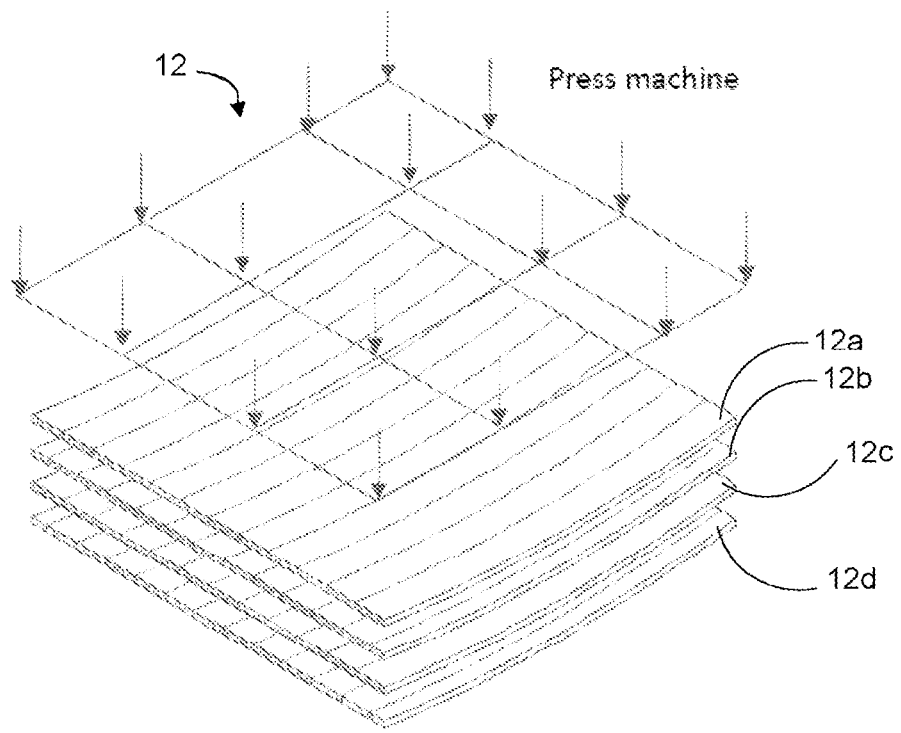
FIG. 4A is an expanded view of a first layer or second layer according to an embodiment of the invention in which the sub-layers are arranged in the same direction.
Figure 4B:
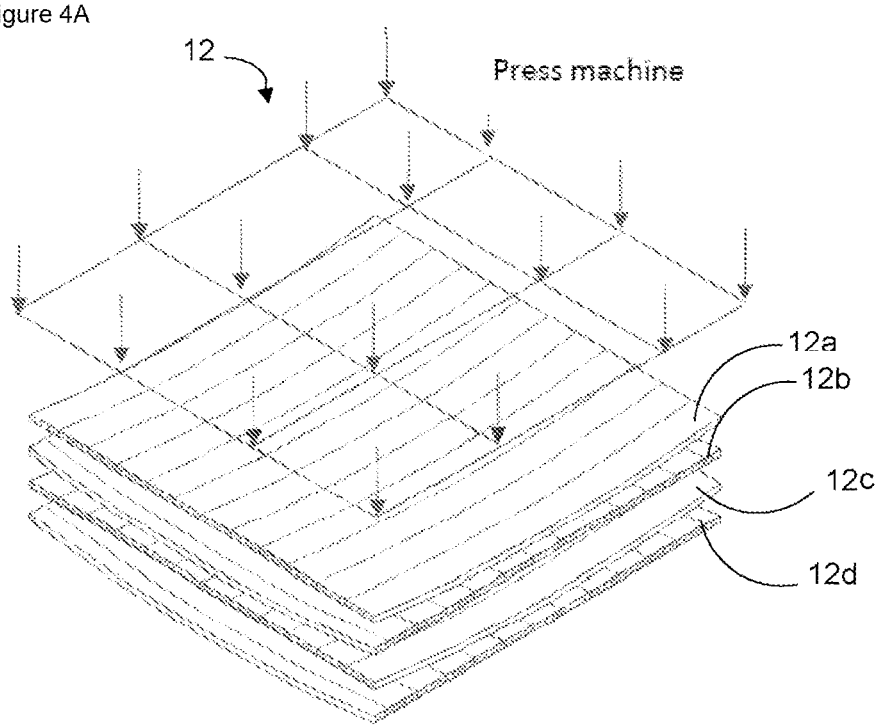
FIG. 4B is an expanded view of a first or second layer according to an embodiment of the invention in which the sub-layers are arranged perpendicular.

As best seen in FIG. 4, the plurality of sub-layers 12*a-d* are stacked on top of each other and pressed and glued together in their curved shape to form the first layer 12. The process is then repeated to form the second layer 14. The assembled first and second layers are shown in FIGS. 2 and 3. During assembly of the construction element 10, the first and second layers 12, 14 are pressed and flattened onto the core layer 16 while curing the glue or applying the mechanical fixings. In this way, a pre-stressed status is introduced to the construction element 10. The plurality of sub-layers 12*a-d* can be arranged such that the bamboo fibres in each sub-layer are parallel to bamboo fibres in adjacent sub-layers to produce one-way pre-stressed member to create one-way pre-stressing (FIG. 4*a*). In other words, adjacent sub-layers curve in the same direction such that the curved edges of adjacent sub-layers are superimposed on top of one and other. Alternatively, the plurality of sub-layers 12*a-d* can be arranged such that the bamboo fibres in each sub-layer are arranged perpendicular to bamboo fibres in adjacent sub-layers to create two-way pre-stressing (FIG. 4*b*). In other words, adjacent sub-layers are arranged orthogonally such that the curved edges of adjacent sub-layers are perpendicular to one and other. The type of pre-stressing may be selected according to the engineering specifications based on the structural analysis and design.

Figure 5:
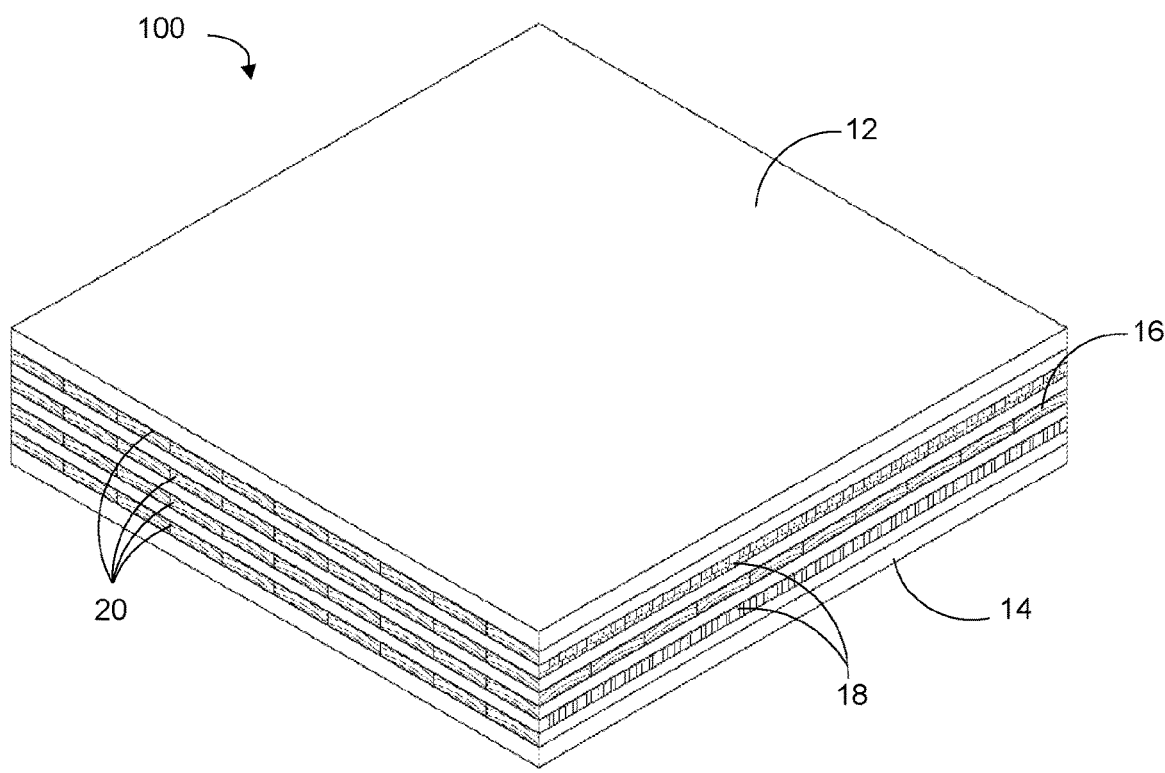
FIG. 5 is a schematic view of a construction element according to an embodiment of the invention in which the core layer comprises cross-laminated engineered bamboo and timber layers.

The composition of the core layer 16 may be selected to meet the specifications of the engineering application. FIG. 5 shows an embodiment of the construction element 100, wherein the core layer 16 comprises a plurality of cross-laminated sub-layers. That is, each sub-layer is oriented perpendicular to adjacent sub-layers. In the illustrated embodiment, the sub-layers comprise a mixture of straight-engineered bamboo (i.e. laminated bamboo or bamboo scrimber) interlayers 18 and timber board interlayers 20. However, as would be appreciated by a person skilled in the art, the exact arrangement of the engineered bamboo and timber layers is flexible and able to accommodate different architectural and engineering specifications in complex constructions. The interlayers of the core layer 16 may be bonded together by adhesive or mechanical fixings.

Figure 6:
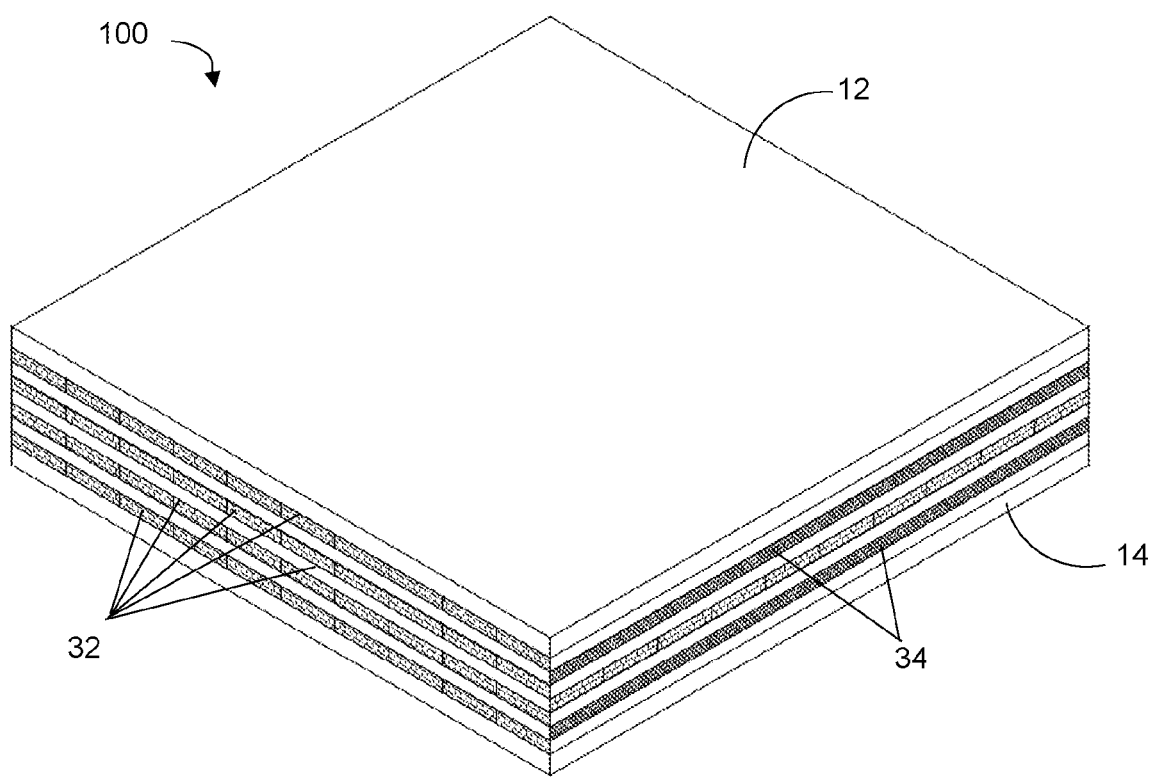
FIG. 6 is a schematic view of a construction element according to an embodiment of the invention having a core layer comprising timber and a plurality of support members connected to the first and second layers via a butt connections.
Figure 7:
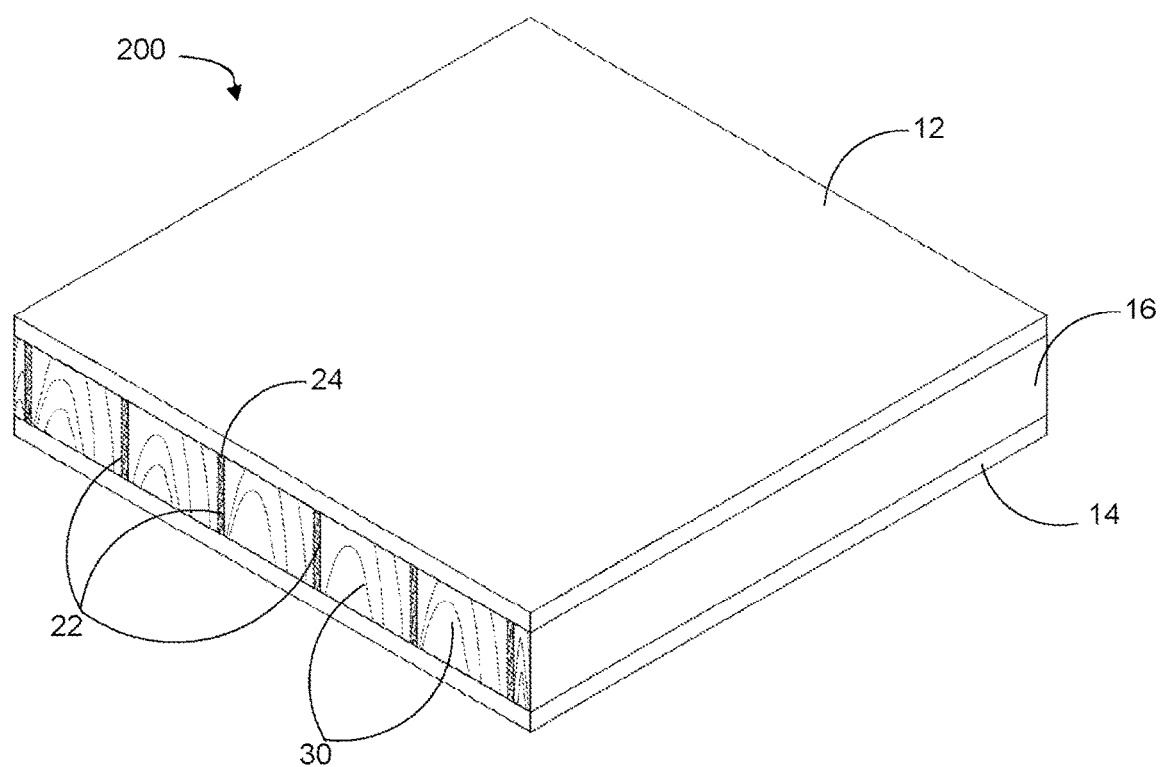
FIG. 7 is an expanded view of the construction element shown in FIG. 6.
Figure 8:
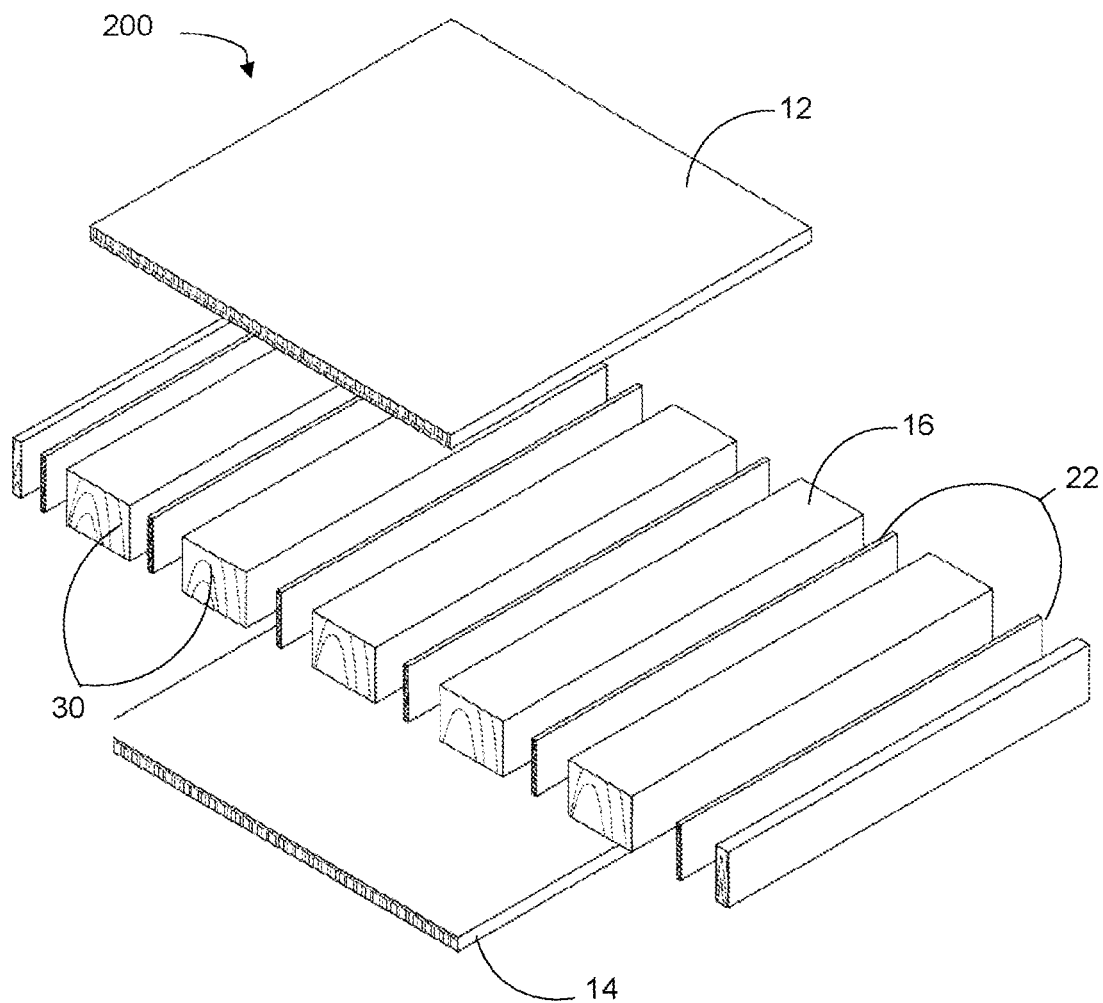
FIG. 8 is a schematic view of a construction element according to an embodiment of the invention having a core layer comprising timber and a plurality of support members connected to the first and second layers via tongue-and-groove connections.
Figure 9:
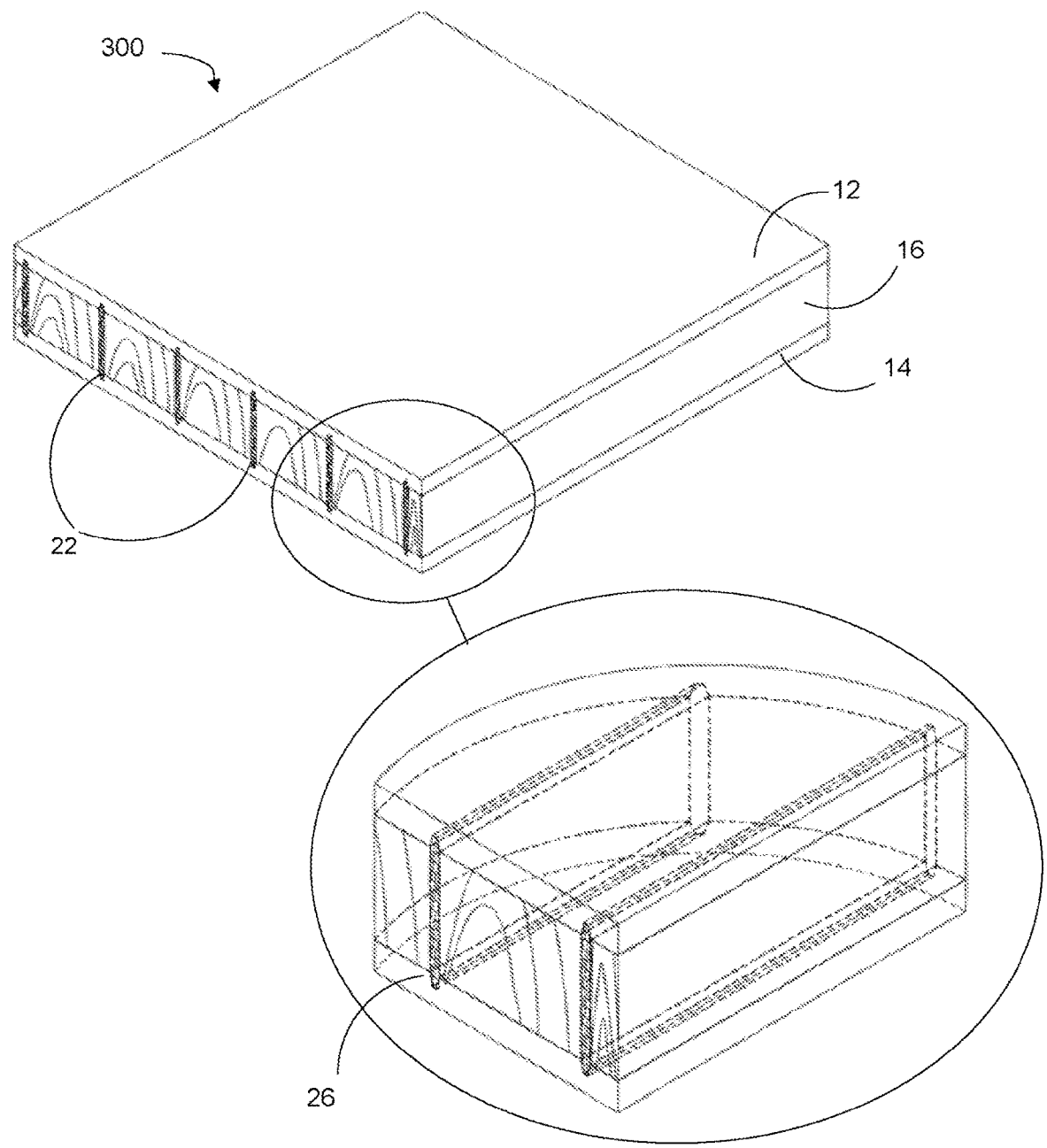
FIG. 9 is an expanded view of the construction element shown in FIG. 8.

In FIGS. 6 and 7, a construction element 200 is shown having a core layer 16 comprising a plurality of support members 22. In the illustrated embodiment, the support member is a web, which is formed from engineered bamboo. However, any suitable material known in the art may be used. In this embodiment, the web is bonded with first and second layers 12, 14 via butt connections 24. A simple butt connection may be advantageous as they are typically straightforward to manufacture. An alternative embodiment of the construction element 300 is shown in FIGS. 8 and 9, wherein a plurality of support members (i.e. a plurality of webs) are bonded to the first and second layers 12, 14 via tongue-and-groove connections 26. As shown in FIG. 3, the tongue-and-groove channels 28, if required, may be routed into the first and second layers 12, 14 before the construction element 300 is assembled. A tongue-and-groove connection provides a more secure connection at the expense of higher machining costs. However, the tongue-and-groove connections may be desired to prevent early failure at the connection and increase the overall strength across the whole construction element.

In the illustrated embodiments shown in FIGS. 5 to 9, the webs are equally spaced within the core layer 16. However, other suitable arrangements will be apparent to a person skilled in art. For example, the distribution of the support members 22 can be varied at different locations. The number of support members 22 may range from 1 to 160. However, any number of support members 22 may be used according to the particular architectural and engineering specification. The thickness of each support member may range from 10 mm to 300 mm. The centre-to-centre distance of the support member may be in the range of 100 mm to 4000 mm.

In the illustrated embodiments, the area between adjacent webs is infilled with wood 30 such as traditional timber or engineered timber lumber. The web and timber or engineered timber may be bonded by an adhesive or mechanical fixings or any other suitable means. Alternatively, in some embodiments the timber or engineered timber infill may not be necessary, for example, if the external loading on the construction element is anticipated to be relatively low. In such embodiments, the spaces in-between the web may be left unfilled or infilled with insulation foam to improve the thermal performance of the structural member.

Once the core layer 16 is manufactured, the first and second layers 12, 14 may be bonded to opposite sides of the core layer, for example, by an adhesive or mechanical fixings (nails, screws, bolts, dowels, etc). Advantageously, openings for windows, doors and stairwells, can be cut out according to architectural specifications after the construction element has been assembled. Final finishes (not shown), such as wood panels, tiles, etc. can be fixed onto the outer surfaces.

Figure 10:
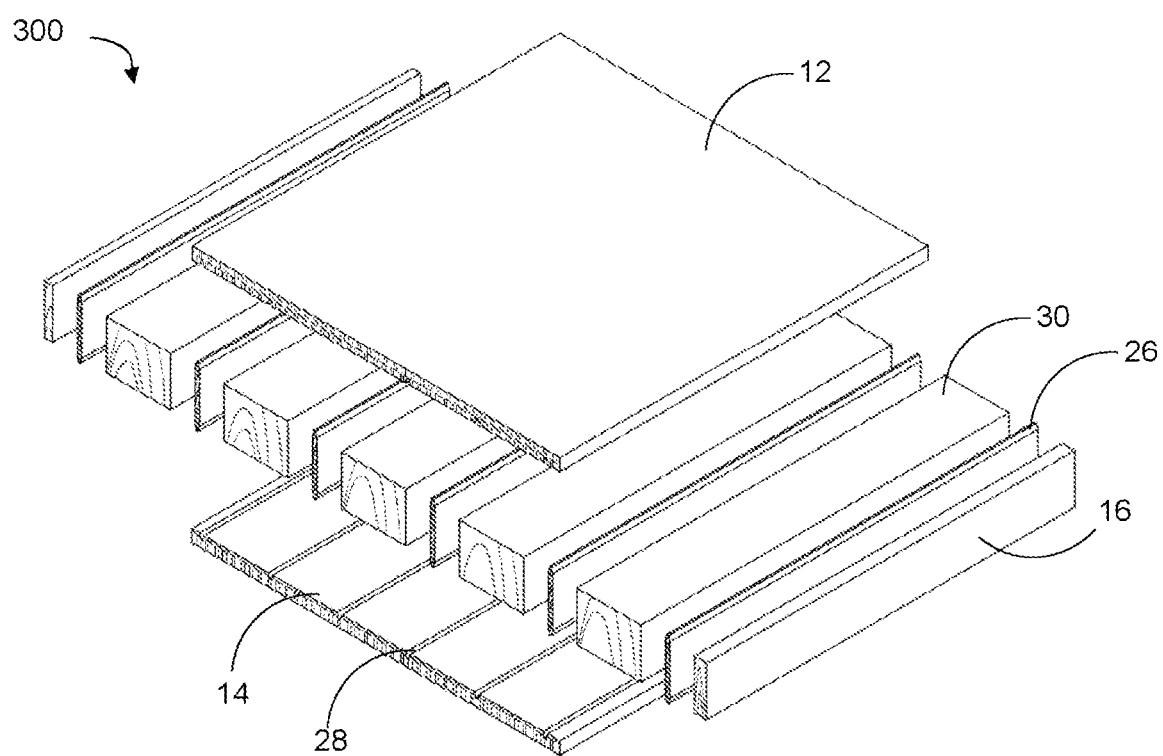
FIG. 10 shows a schematic representation of a method of manufacturing a construction element according to one embodiment of the invention.
Figure 11:
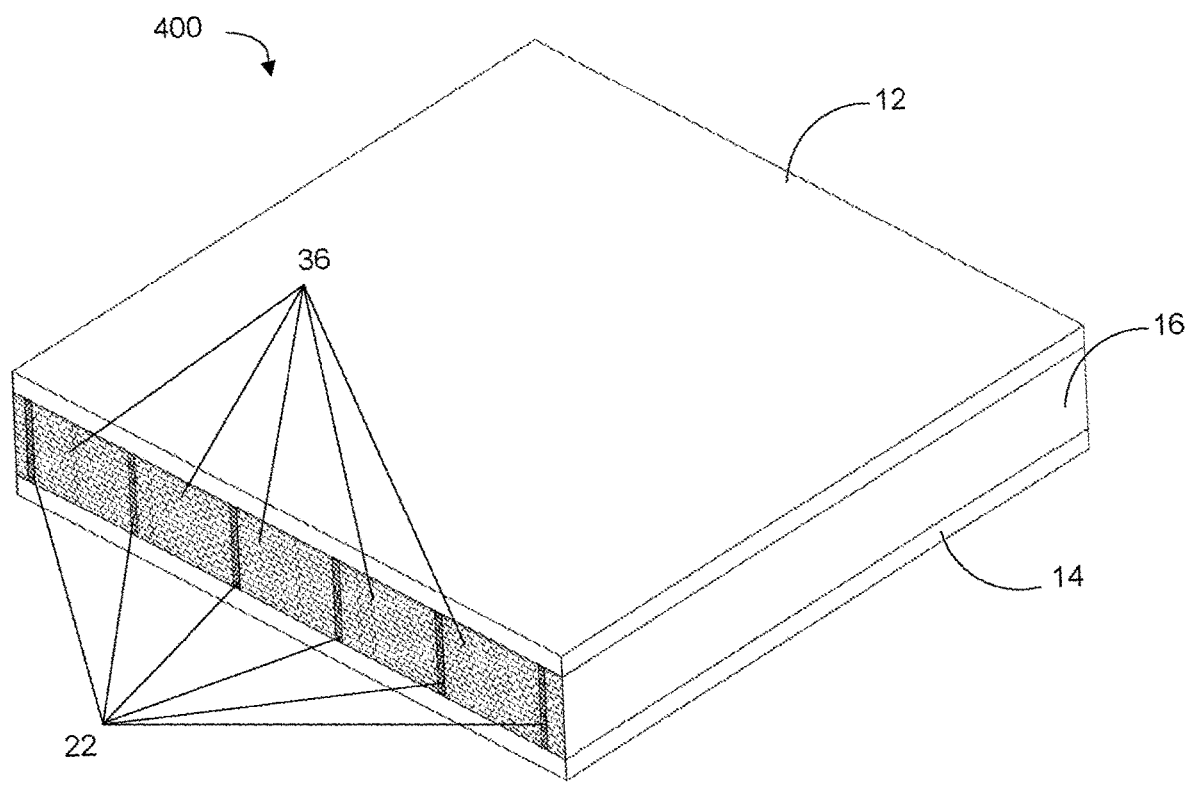
FIG. 11 shows a schematic representation of an alternative method of manufacturing a construction element according to an embodiment of the invention.

Two exemplary methods of producing a sandwich beam in accordance with the present invention are now described with reference to FIGS. 10 and 11. However, others ways of assembling the construction element will be apparent to a person skilled in the art. For the purposes of clarity, the methods below are described in relation to a construction element in which only the first layer is pre-stressed. The method of superposition can be adopted to evaluate the summation of the overall structural response in instances where there are more than one pre-stressed layers.

In a first method, shown schematically in FIG. 10A, a curved engineering bamboo first layer is arranged such that the convex surface is adjacent to an outer surface of a core timber layer. The first layer is then pressed and glued onto the core timber layer. The pre-stressed condition is introduced during the pressing process as the first layer is straightened or substantially straightened against the outer surface of the core layer. When the press is released, the internal stresses remain inside the first layer and interact with the other parts of the construction element. A simplified analytical module is shown in FIG. 10B. As would be appreciated by a person skilled in the art, FIG. 10B is a simplification and approximation of the structural model.

In an alternative embodiment of the method shown in FIG. 11A, the curved engineering bamboo first layer is arranged such that the concave surface is adjacent to an outer surface of a core timber layer. That is, the first layer is fixed onto to the core timber layer at both ends. The first layer is then pressed and glued onto the core timber layer as described for the first method above. The difference in this method is that on top of the equivalent pre-stressed moment, a pre-stressed axil force is also induced during the pressing procedure.

A sample solution for the structural analysis of bamboo-timber composite beam according to an embodiment of the claimed invention is shown below. For the purposes of clarity, the analysis below includes the assumption that only one bamboo layer is fabricated with residual stress. As would be understood by a person skilled in the art, the method of superposition can be adopted to evaluate the sum of the overall structural response where both the first and second bamboo layers are fabricated with residual stress.

In a simply supported beam with uniformly distributed load w applied on its entire span L, the maximum stress in the engineered bamboo layers may be defined as follow:

$$\sigma_{xBmax} = \frac{E_B}{[EI]} \left( \frac{h_T}{2} + h_B \right) \left( \frac{wL^2}{8} - M_P \right) \quad (1)$$

the maximum stress in the timber layer may be defined as follows:

$$\sigma_{xTmax} = \frac{E_T}{[EI]} \left( \frac{h_T}{2} \right) \left( \frac{wL^2}{8} - M_P \right) \quad (2)$$

In equations (1) and (2),
[EI] is the homogenised equivalent bending stiffness of the bamboo-timber composite beam that can be derived from Euler-Bernoulli beam theory.
$E_B$ is the Young's Modulus of the engineered bamboo
$E_T$ is the Young's Modulus of the core layer
$h_T$ is the thickness of the timber layer
$h_B$ is the thickness of the engineering bamboo layers
$M_P$ is the equivalent counteracting bending moment caused by the pre-stressing As shown in equations (1) and (2), the negative contribution of $M_P$ reduces the magnitude of the maximum stress due to the pre-stressed effect.

Alternative methods for analysing the structural response would be apparent to a person skilled in the art.

EXAMPLES

Figure 12:
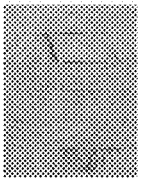
FIG. 12 shows a comparison of the Modulus of Rupture (MOR) measured in a four point bending test.
Figure 12:
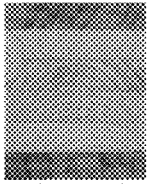
Figure 12:
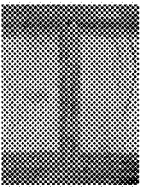
Figure 13:
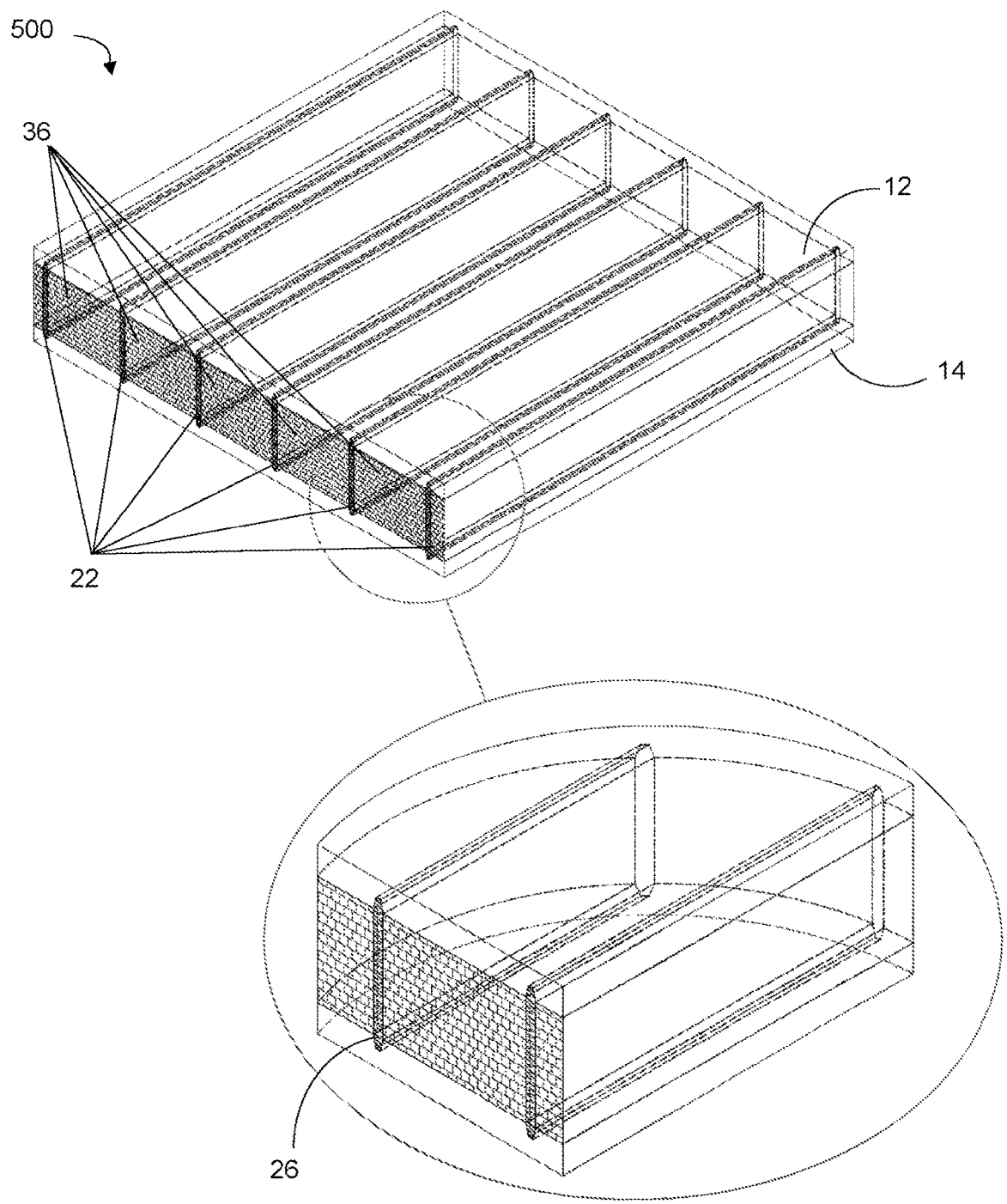
Figure 14:
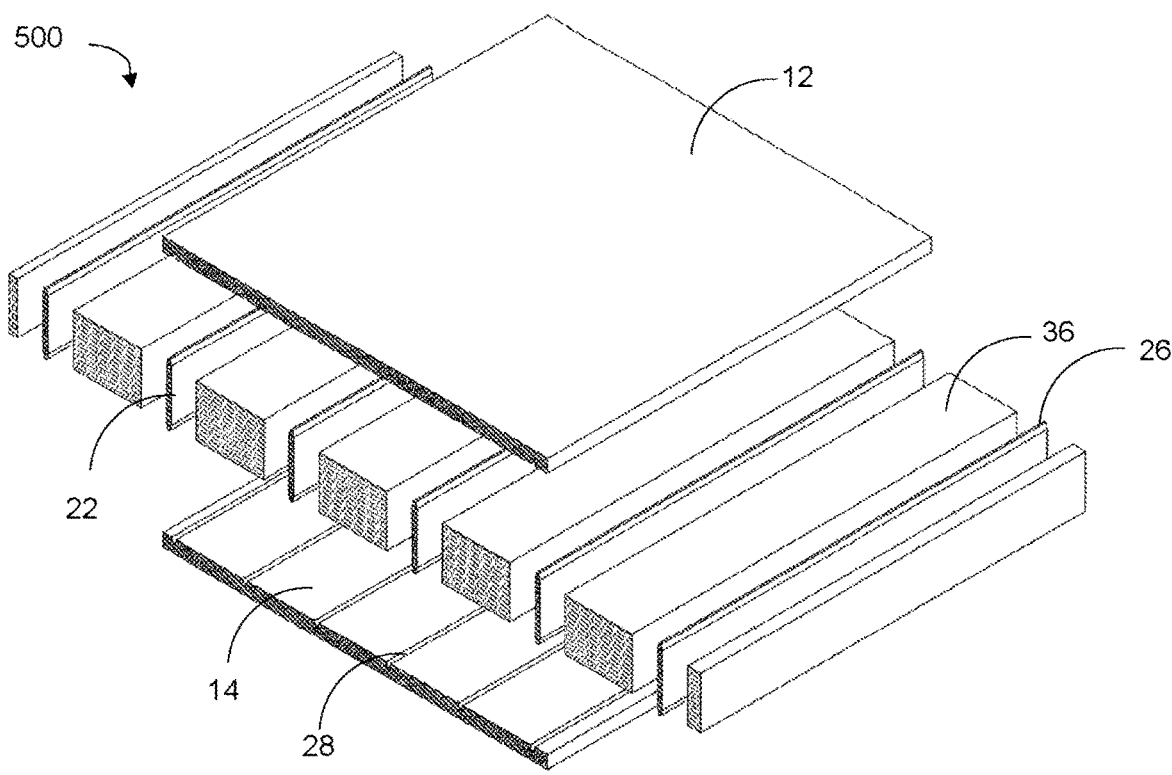
Figure 15:
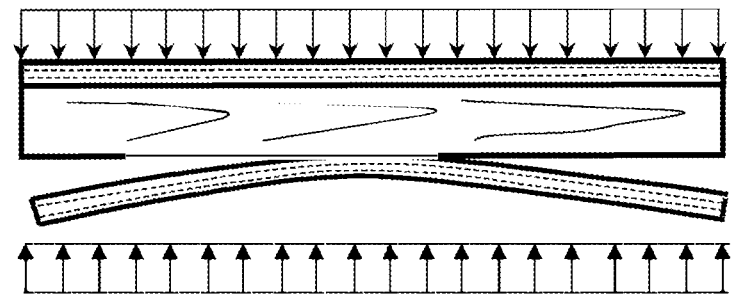
Figure 15:
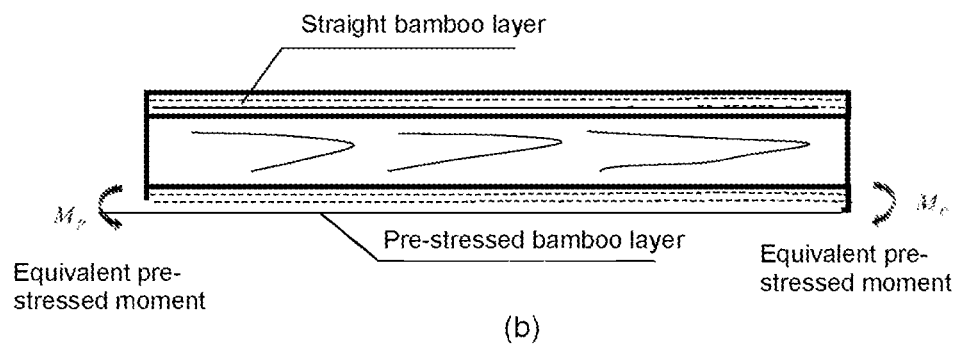
Figure 16:
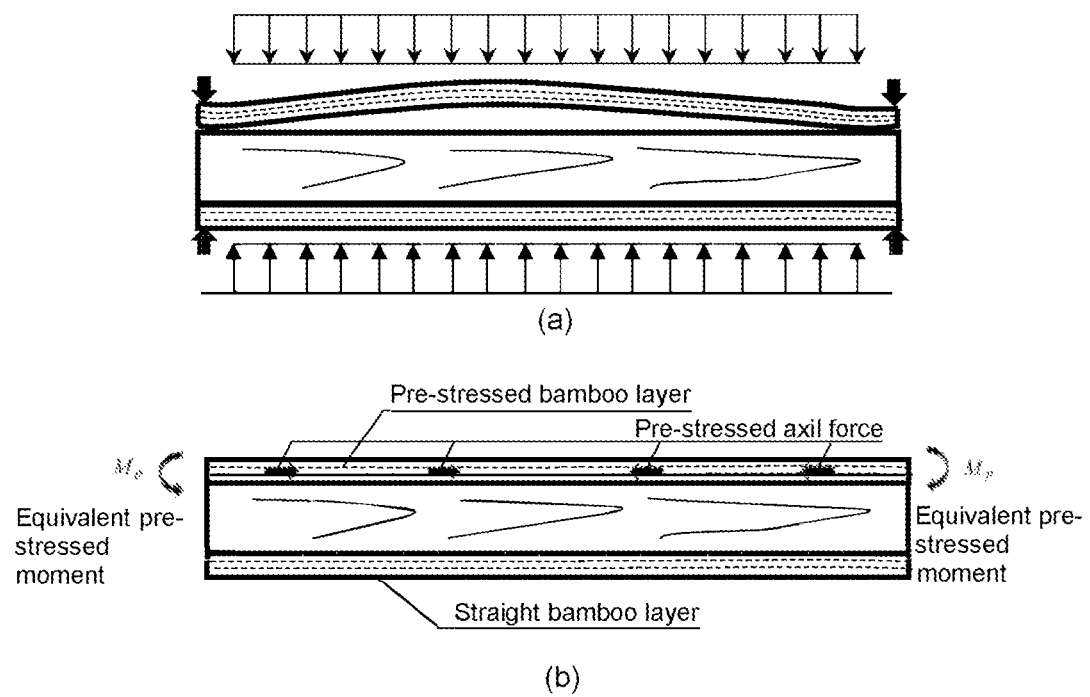

The Modulus of Rupture (MOR) was measured for samples of a sandwich Bamboo-Timber beam (Example 1), an I-bone Composite Bamboo-Timber beam (Example 2) and a Traditional Glulam Beam (Comparative Example). In Examples 1 and 2, both the first and second bamboo layers are fabricated with a residual stress in accordance with an embodiment of the claimed invention. The sample were tested in the four-point bending and shear field test in accordance with BS EN 408:2010+A1:2012. As shown in FIG. 12, the combination of these two economical, fast-growing natural materials can achieve the same strength as hardwood glulam beam.

It will be appreciated by persons skilled in the art that the above embodiment has been described by way of example only and not in any limitative sense, and that various alterations and modifications are possible without departing from the scope of the invention as defined by the appended claims.

The invention claimed is:

1. A construction element comprising at least a first and second bamboo layer and having a core layer interposed therebetween, characterised in that at least one of the first and second bamboo layers are fabricated with a residual stress, wherein the first and/or second layer(s) is biased against a pre-formed radius of curvature.

2. A construction element according to claim 1, wherein the first and/or second bamboo layer(s) has a first surface that is in compression and a second surface that is in tension.

3. A construction element according to claim 1, wherein the first and/or second bamboo layer(s) is formed from a plurality of superposed bamboo sub-layers.

4. A construction element according to claim 3, wherein the sub-layers are formed of laminated bamboo or bamboo scrimber.

5. A construction element according to claim 3, wherein the plurality of sub-layers are arranged such that the bamboo fibres in each sub-layer are parallel to bamboo fibres in adjacent sub-layers.

6. A construction element according to claim 3, wherein the plurality of sub-layers are arranged such that the bamboo fibres in each sub-layer are arranged perpendicular to bamboo fibres in adjacent sub-layers.

7. A construction element according to claim 1, wherein each of the first and second bamboo layers are fabricated with residual stress.

8. A construction element according to claim 1, wherein the core layer comprises a laminated wood.

9. A construction element according to claim 8, wherein the core layer comprises cross-laminated wood.

10. A construction element according to claim 9, wherein the core layer comprises cross-laminated engineered bamboo and timber interlayers.

11. A construction element according to claim 1, wherein the core layer comprises at least one support member arranged perpendicular to the first and second bamboo layers and extending therebetween.

12. A construction element according to claim 11, wherein the at least one support member is connected to the first and second bamboo layers via a butt connection.

13. A construction element according to claim 11, wherein the first and second bamboo layer each comprise at least one groove configured to receive the at least one support member in a tongue-and-groove arrangement.

14. A construction element according to claim 11, wherein the core layer comprises a plurality of support members and optionally, a wood or insulation material between said support members.

15. A construction element according to claim 11, wherein the supporting member is a web.

16. A construction element according to claim 1, wherein the construction element is a truss, a wall panel, a floor panel, a column or pillar, or a beam, optionally, a sandwich beam, an I-beam or a double-web beam.

17. A method of manufacturing a construction element, comprising assembling a first and second bamboo layer with a core layer interposed therebetween, characterised in that at least one of the first and second bamboo layers are fabricated with a residual stress; and wherein said assembling comprising: providing the first and second bamboo layer, wherein at least one of the first and second bamboo layers has a pre-formed radius of curvature; providing the core layer; and pressing the first and second bamboo layers and the core layer together such that the first and/or second bamboo layer(s) is substantially straightened against the pre-formed radius of curvature to induce the residual stress.

18. A method according to claim 17, wherein providing the first and second bamboo layer comprises the initial steps of:

(i) providing a plurality of bamboo sub-layers;

(ii) applying an adhesive to the sub-layers;

(iii) pressing, and optionally heating, the sub-layers until the adhesive is cured to form the first bamboo layer having a pre-formed radius of curvature; and (iv) optionally, repeating steps (i) to (iii) to form the second bamboo layer.

19. A method according to claim 18, wherein the sub-layers are formed of laminated bamboo or bamboo scrimber.

20. A method according to claim 18, wherein the plurality of sub-layers are arranged such that the bamboo fibres in each sub-layer are parallel to bamboo fibres in adjacent sub-layers.

21. A method according to claim 18, wherein the plurality of sub-layers are arranged such that the bamboo fibres in each sub-layer are arranged perpendicular to bamboo fibres in adjacent sub-layers.

22. A method according to claim 17, further comprising forming tongue-and-groove channels in a surface of the first and second bamboo layers.

23. A method according to claim 17, wherein each of the first and second bamboo layers are fabricated with residual stress.

* * * * *